(12) United States Patent
Matsumoto

(10) Patent No.: US 6,459,444 B1
(45) Date of Patent: Oct. 1, 2002

(54) LINE-SEQUENTIAL RECORDING METHOD AND APPARATUS THEREOF USING STATIONARY RECORDING MATERIAL

(75) Inventor: Nobuo Matsumoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/149,092

(22) Filed: Sep. 8, 1998

(30) Foreign Application Priority Data

Sep. 10, 1997 (JP) .............................................. 9-245782

(51) Int. Cl.⁷ ................................................ B41J 27/00
(52) U.S. Cl. ....................................... 347/256; 347/241
(58) Field of Search ................................ 347/239, 241, 347/242, 243, 255, 256, 257; 348/764, 770, 771, 755, 766, 751; 355/45, 60, 50; 362/262; 358/296, 497; 359/212

(56) References Cited

U.S. PATENT DOCUMENTS

| | | | | |
|---|---|---|---|---|
| 4,015,892 A | * | 4/1977 | Tabata ......................... | 359/212 |
| 4,196,455 A | * | 4/1980 | Brooke ........................ | 358/296 |
| 4,212,532 A | * | 7/1980 | Hidenori ....................... | 355/60 |
| 4,675,702 A | * | 6/1987 | Gerber ......................... | 347/239 |
| 4,717,939 A | * | 1/1988 | Yanagawa ...................... | 355/50 |
| 4,792,858 A | * | 12/1988 | Landsman ..................... | 358/497 |
| 5,047,800 A | * | 9/1991 | Fukumoto et al. ............ | 355/45 |
| 5,191,447 A | * | 3/1993 | Pinard ......................... | 358/497 |
| 5,325,116 A | * | 6/1994 | Sampsell ..................... | 347/255 |
| 5,923,358 A | * | 7/1999 | Yamakawa .................... | 347/238 |
| 5,954,424 A | * | 9/1999 | Anderson et al. ............ | 362/262 |

FOREIGN PATENT DOCUMENTS

JP    27-24967    *    2/1982    ..........  G03G/15/04

* cited by examiner

Primary Examiner—Hai Pham
(74) Attorney, Agent, or Firm—Sughrue Mion, PLLC

(57) ABSTRACT

A recording sheet of a recording material is transported on a conveyer belt to a recording station, and is held to be flat and stationary at the recording station by vacuum suction. A line image projection device projects a line recording light onto the recording sheet along a main scan direction on the basis of image data of each line of an image to print. Synchronously with the projection of the line recording light, projecting position on the recording sheet is shifted perpendicularly to the main scan direction by moving the line image projection device or an optical scanning device. The optical scanning device consists of at least a mirror and a mirror shift mechanism.

12 Claims, 14 Drawing Sheets

FIG. 2
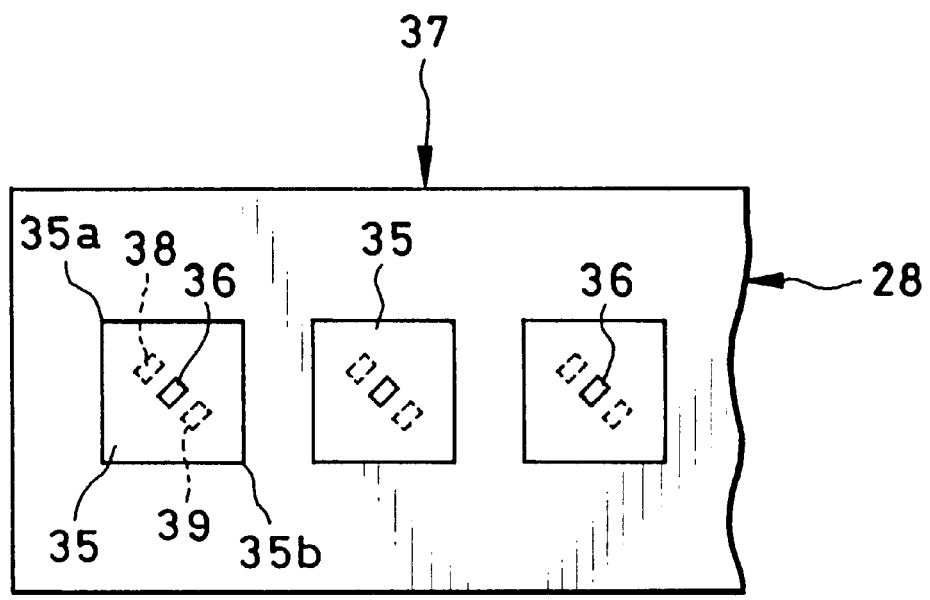
FIG. 3A  FIG. 3B  FIG. 3C
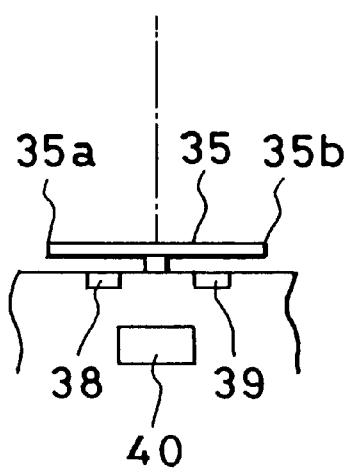 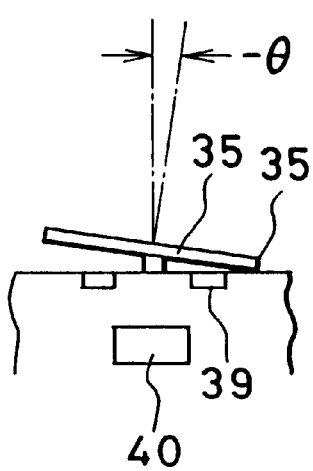 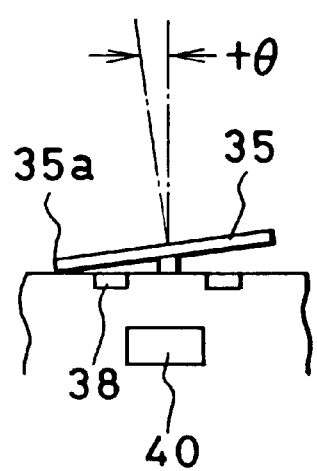

LINE-SEQUENTIAL RECORDING METHOD AND APPARATUS THEREOF USING STATIONARY RECORDING MATERIAL

BACKGROUND OF THE INVENTION

1. Field of the Invention

The present invention relates to an image recording method and an apparatus therefor, especially to a line-sequential recording method and an apparatus therefor, by which an image is recorded on a recording material in a line sequential fashion on the basis of image data of the image to record.

2. Background Arts

There are frame-simultaneous method, line-sequential method and dot-sequential method in image recording. In the frame-simultaneous method, an image frame is recorded on a recording material at one time. In the line-sequential recording method, an image frame is recorded line by line on a recording material. In the dot-sequential method, an image frame is divided into dots or pixels and is recorded one dot after another on a recording material.

Widely used silver-salt photo-printers adopt the frame-simultaneous method, wherein an optical image of an original recorded on a photo film is projected onto a photographic material such as a photographic paper through an image forming lens. On the other hand, widely used photo-copiers adopt the line-sequential method, wherein an original image is scanned by a light strip, and a light reflected from the original image is projected onto a rotating photosensitive drum, forming an electrostatic image on the drum. The electrostatic image is developed by depositing toner, and the toner-image is transferred to and fixed on ordinary paper. The dot-sequential method is usually used in ink jet printers, wherein a head ejects ink dots while moving in a main scan direction or the crosswise direction of the recording paper that is moving in a sub-scan direction perpendicular to the main scan direction. Thus the ink dots are sequentially disposed on the recording material to record an image frame.

Besides the above optical image recording apparatuses that optically form an image from an original, many types of digital image recording apparatuses have been developed. In the digital image recording apparatus, digital image data is transformed into an optical image through an image projection device, e.g., LCD, CRT, digital micromirror device (DMD), laser scanner, and electro-luminescent display. Besides light and ink, it is also known in the art to project electromagnetic rays, including X rays, ultraviolet rays, infrared rays, and electron beams, or powdery or liquid pigment onto a recording material on the basis of electric image signals, for recording an image or a latent image. Also in those recording apparatuses based on the electric image signal, the image is recorded according to the frames-imultaneous method, the line-sequential method or the dot-sequential method.

In order to achieve an adequate resolution, the digital image recording apparatus needs a high pixel density, i.e., an enormous number of pixels per frame. Accordingly, for the frame-simultaneous method, a very complicated and expensive image projection device is necessary. On the other hand, the dot-sequential method needs a main scanning mechanism and also takes a longer time compared to the other methods. For this reason, the line-sequential method has been preferred in the digital image recording apparatus, as it costs less than the frame-simultaneous method, and its printing speed is higher than that of the dot-sequential method, but lower than that of the frames-imultaneous method.

In the digital image recording apparatus adopting the line-sequential method, the image projection device is mounted stationary, while a recording sheet is transported at a constant speed in a sub-scan direction perpendicular to a main scan direction along which each line of the image to print extends. In many cases, transport rollers nip the recording sheet before and behind a recording stage to transport the recording sheet through the recording stage, while applying a certain tension to maintain the recording sheet flat in the recording stage.

Because of margins necessary for the transport rollers, it is impossible to use the entire area of the recording sheet for recording. In addition, the transport rollers may slip and make the transport unstable due to various surface conditions of the recording material. Instability in transport can cause unexpected variations in recording density, or lower the flatness of the recording sheet in the recording stage and thus lower the sharpness of the recorded image. Moreover, the gap between the transport rollers of each pair should be adjusted according to the thickness of the recording material.

SUMMARY OF THE INVENTION

In view of the foregoing, an object of the present invention is to provide a recording method which makes it possible to print a high quality image on the entire area of a recording material, and an apparatus therefor.

A second object of the present invention is to provide an image recording apparatus which is easy to adjust to the physical properties of the recording sheet such as thickness, frictional factor, and modules in tension, as well as to the size of the recording sheet.

Another object of the present invention is to provide a image recording apparatus which is inexpensive and simple in construction, and has small moving elements.

A further object of the present invention is to provide an image recording apparatus which can make the frame-simultaneous recording as well as the line-sequential recording.

To achieve the above and other objects, according to an image recording method of the present invention, a recording material is held stationary at a recording station, and electromagnetic rays or pigment is projected onto the recording material held stationary at the recording station for recording at least one line at a time along a main scan direction, projecting position of the electromagnetic rays or pigment onto the recording material being shifted in a sub-scan direction perpendicular to the main scan direction at a predetermined speed, to record an image frame line by line on the stationary recording material.

An image recording apparatus of the present invention is provided with a holding device for holding a recording material stationary at a recording station; a line image projection device for projecting electromagnetic rays or pigment onto the recording material for recording at least one line at a time along a main scan direction while the recording material is held stationary at the recording station; and a scanning device for shifting projecting position of the electromagnetic rays or pigment onto the recording material in a sub-scan direction perpendicular to the main scan direction at a predetermined speed, to record an image frame line by line on the stationary recording material.

Because it is unnecessary to transport the recording material during the recording of one frame, the recording apparatus of the present invention is free from the problems as described above.

According to a preferred embodiment, the holding device holds the recording material to be flat at the recording station by vacuum suction.

According to a preferred embodiment, the scanning device shifts the line image projection device in parallel to the sub-scan direction of the stationary recording material, to shift the projecting position of the electromagnetic rays or pigment onto the recording material.

According to another preferred embodiment, wherein the electromagnetic rays are recording light, and the recording material is a photosensitive material, the scanning device is comprised of a mirror for directing the recording light from the line image projection device toward the photosensitive material; and a mirror shift device for shifting the mirror along a light path of the recording light that is defined by the line image projection device and the projecting position of the recording light on the photosensitive material, the mirror shift device maintaining the mirror at a constant angle to the photosensitive material.

As it is only necessary to move a single small mirror, it is easy to combine a frame exposure device for recording an image frame at a time with the line-sequential exposure device of this embodiment.

BRIEF DESCRIPTION OF THE DRAWINGS

The above and other embodiments of the present invention and their advantages will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 2 is an explanatory plan view of the digital micromirror device;

FIGS. 3A, 3B and 3C are explanatory views illustrating the operation of the digital micromirror device;

DETAILED DESCRIPTION OF THE PREFERRED EMBODIMENT

Figure 16:
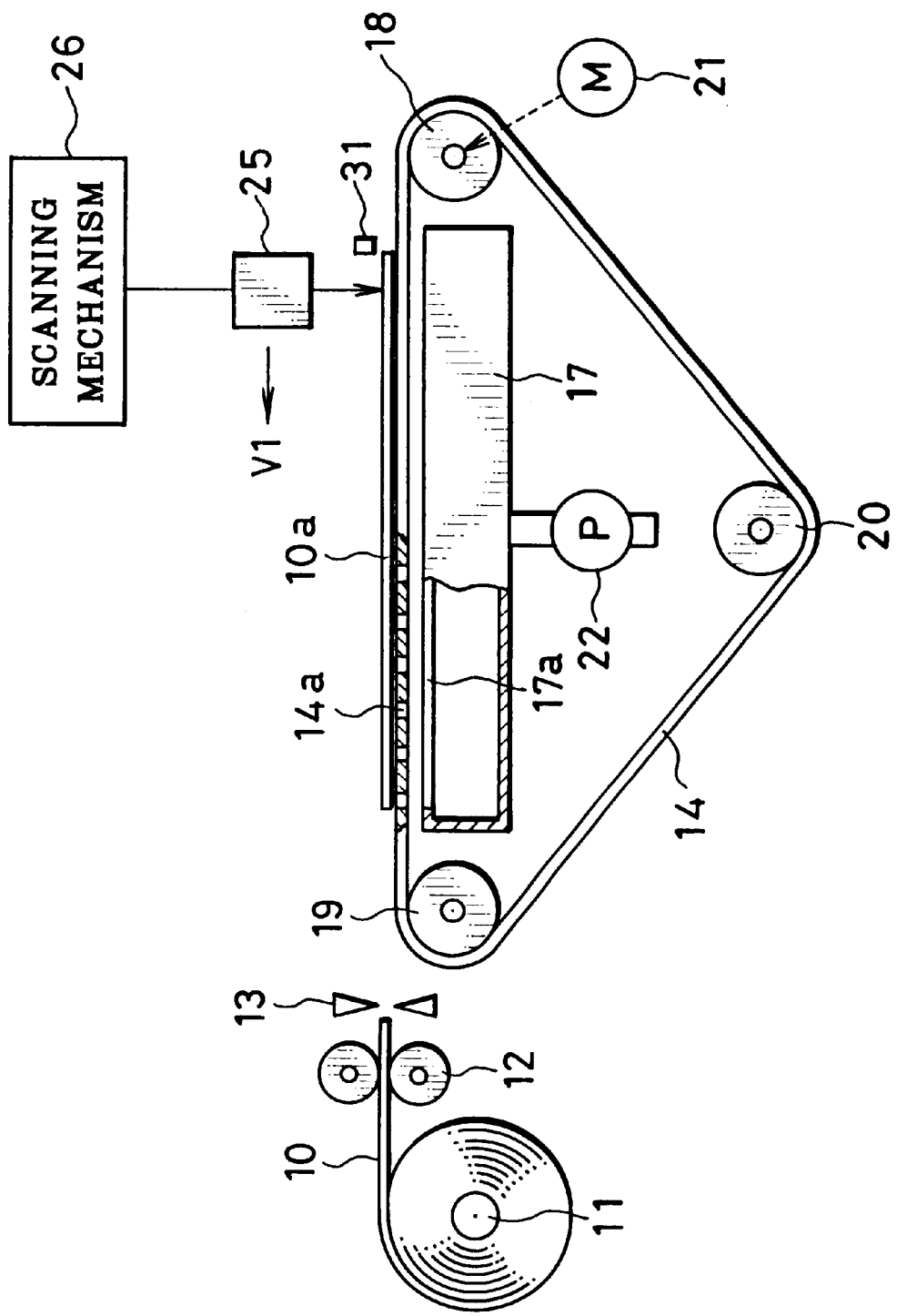
FIG. 16 is a conceptual diagram showing an image recording apparatus of the present invention wherein a line image projection device is moved in a sub-scan direction, while a recording sheet stops at a recording station.

In FIG. 16 showing the concept of the invention, a recording material 10 is coiled around a spool 11 with its recording surface outside. The recording material 10 is withdrawn from the roll through a pair of feed rollers 12, and is cut at a given length by a cutter 13 into a sheet 10a. The recording sheet 10a is fed to a conveyer belt 14 through the feed rollers 12.

The conveyer belt 14 is put around three rollers 18, 19 and 20 which are placed before, behind and below a recording station 17 respectively, forming a triangular conveyer path. The roller 18 is a drive roller that is rotated by a motor 21. The conveyer belt 14 has a large number of suction holes 14a for holding the recording sheet 10a tightly thereon.

The recording station 17 is constituted of a box whose interior is connected a vacuum pump 22, and which has a plurality of slits 17a through its flat top wall. The slits 17a extend parallel to a conveying direction of the recording sheet 10a. When the box is evacuated by the vacuum pump 22, the recording sheet 10a is sucked onto the recording station 17 through the slits 17a and the suction holes 14a of the conveyer belt 14. In this way, the recording sheet 10a is maintained flat at the recording station 17.

A line image projection device 25 projects electromagnetic rays, e.g. light, ultraviolet rays, or liquid, powdery or gaseous pigment, e.g. ink, onto the recording sheet 10a for recording at least one line at a time along a main scan direction, that is perpendicular to the conveying direction of the recording sheet 10a in this embodiment. The line image projection device 25 is moved by a scanning mechanism 26 at a constant speed V1 in parallel to a sub-scan direction as shown by an arrow that is perpendicular to the main scan direction. The line image projection device 25 and the scanning mechanism 26 constitute a line-sequential exposure device.

The scanning mechanism 26 may be a feed screw mechanism consisting of nuts and lead screws, an endless belt mechanism, or a wire winding mechanism. Where a feed screw mechanism is used as the scanning mechanism 26, the image projection device 25 is mounted to the nuts. Where an endless belt mechanism is used as the scanning mechanism 26, the image projection device 25 is mounted to a portion of the endless belt. Where a wire winding mechanism is used as the scanning mechanism 26, the image projection device 25 is secured to an end of a wire whose the other end is secured to an unwinding spring, so the line image projection device 25 moves for the sub-scanning as the wire is being wound. A sensor 31 for detecting a leading end of the recording sheet 10a is disposed at the leading end of the recording station 17 in the conveying direction.

The operation of the image recording apparatus shown in FIG. 16 will now be described.

First, the feed rollers 12 is driven by a not-shown motor to withdraw the recording material 10 from the roll toward the conveyer belt 14. The feed rollers 12 stop when the recording material 10 is withdrawn by the given length, and the cutter 13 cuts the recording material 10 into a recording sheet 10a.

Thereafter the motor 21 is driven to move the conveyer belt 14 to convey the recording sheet 10a. When the leading end sensor 31 detects the leading end of the recording sheet 10a, the motor 21 stops. Thus, the recording sheet 10a is placed in a predetermined position on the recording station 17.

Then the vacuum pump 22 is activated to eject the air from the interior of the recording station 17, so that the recording sheet 10a is sucked through the suction holes 14a of the conveyer belt 14 and the slits 17a of the flat top wall of the recording station 17. Thus, the recording sheet 10a is held tight and flat onto the conveyer belt 14 on the recording station 17.

To record an image frame, the line image projection device 25 is driven based on image signals of a first line to project electromagnetic rays or pigment for recording the first line onto the recording sheet 10a. Thereby, the first line is recorded on the recording surface of the recording sheet 10a.

The line image projection device 25 is moved by the scanning mechanism 26 in parallel to the sub-scan direction at the constant speed V1 that is determined with respect to the time necessary for recording one line. After being moved by a length corresponding to one line, the line image projection device 25 is driven by image signals of the next line to print. Thereby, the next line is recorded on the recording sheet 10a adjacent to the first line.

In this way, an image of one frame is recorded line by line on the recording sheet 10a, as the line image projection device 25 is sequentially driven and moved in the sub-scan direction. After the image frame is recorded, the scanning mechanism 26 is driven in the opposite direction to move the line image projection device 25 back to the initial position shown in FIG. 16. Then, the vacuum pump 22 is deactivated, and the conveyer belt 14 is driven to feed the recording sheet 10a having the image frame recorded thereon out of the recording station 17.

It is possible to use an image projection device which projects electromagnetic rays or pigment for recording a plurality of lines at a time. In that case, as a plurality of lines are simultaneously recorded on the recording sheet, the line image projection device is intermittently moved by the length corresponding to these simultaneously recorded lines. This embodiment saves the time necessary for recording one frame. It is also possible to shift the line image projection device by one line movement in the sub-scan direction while the line image projection device 25 is projecting electromagnetic rays or pigment for recording more than one line at a time. According to this modification, each line is recorded by many times of projection of the electromagnetic rays or pigment, so this modification is preferable for reproducing fine gradation image.

Figure 1:
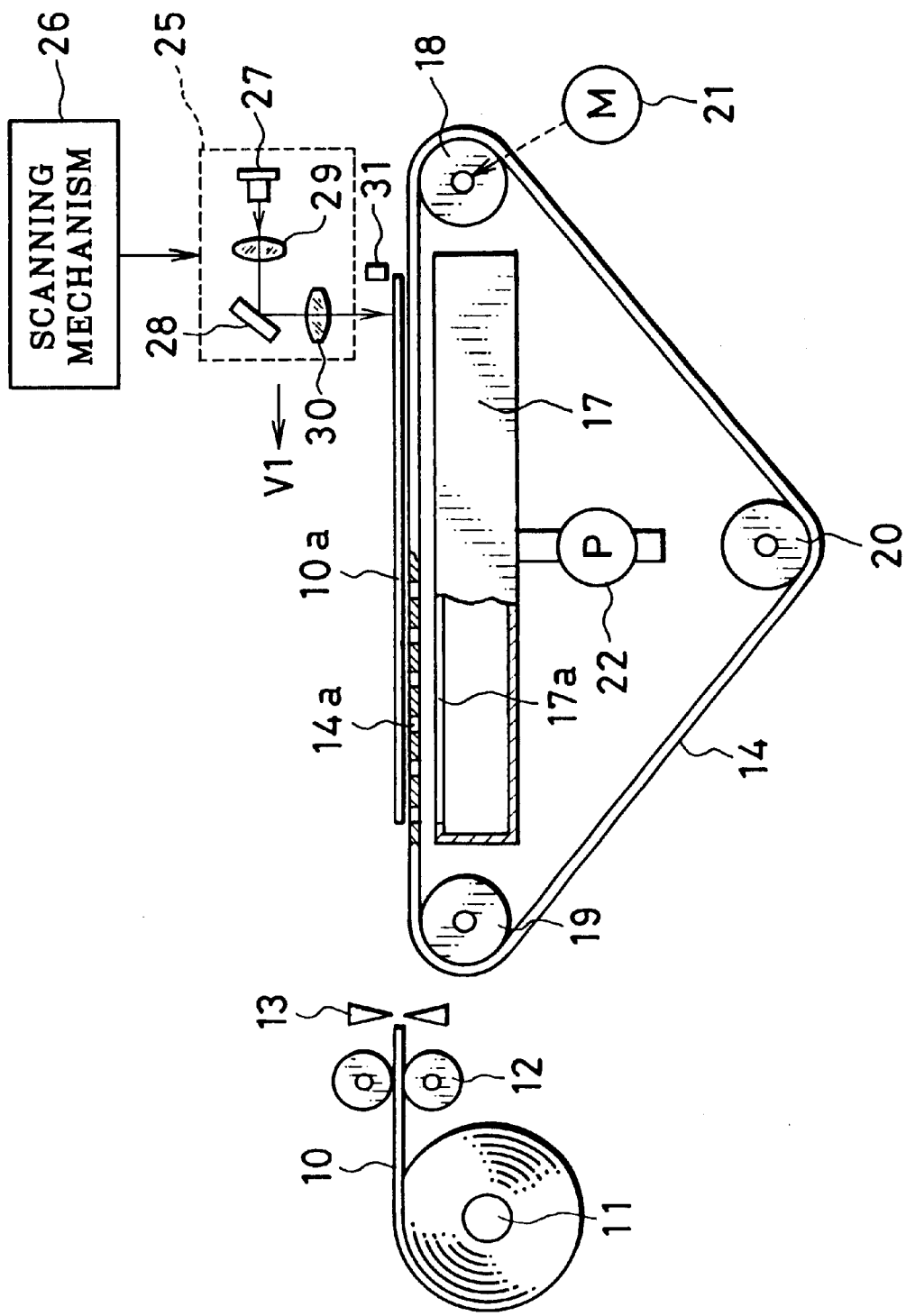
FIG. 1 is a schematic diagram illustrating an image recording apparatus according to a first embodiment of the present invention, wherein a line image projection device uses a digital micromirror device and is moved in the sub-scan direction.

In the embodiment shown in FIG. 1, a line image projection device 25 is constituted of a light source 27, a digital micromirror device (DMD) 28, and a condenser or collective lens 29 and an image forming lens 30 which are placed before and behind the DMD 28. The light source 27 may be a cylindrical lamp, e.g. a fluorescent light tube, or an LED device having a large number of LEDs arranged in a line. The recording material 10 is a photosensitive material, such as photographic paper or film. The photosensitive material 10 is cut by a cutter 13 into a recording sheet 10a, and is stationary held at a recording station 17.

FIG. 2 shows the DMD 28 having a plurality of micromirrors 35 arranged in a line. The micromirror 35 is a square chip, e.g. 16 $\mu$m on a side, and is supported at its center on a post 36 above a static RAM (SRAM) 37. The micromirrors 35 and the SRAM 37 are fabricated on a silicone substrate by a conventional transistor integration technique. The micromirror 35 is made of conductive metal foil, e.g. aluminum foil.

Address electrodes 38 and 39 are formed on opposite diagonal sides of the post 36. By virtue of static electricity charged between the micromirror 35 and the address electrodes 38 and 39, the micromirror 35 is tilted such that one of two tips 35a and 35b that are in alignment with the address electrodes 38 and 39 and the central post 36 comes into contact with the silicone substrate. Practically, the micromirror 35 is suspended over an air gap by torsion hinges at other two tips thereof.

As shown in FIGS. 3A to 3C, each micromirror 35 is disposed above an individual memory cell 40 of the SRAM 37. Each memory cell 40 constitutes a flip-flop with two transistors, which are alternatively turned ON depending upon 1-bit mirror drive data applied to the memory cell 40. The mirror drive data is stored until the next mirror drive data is applied to the memory cell 40. The transistors of each flip-flop are connected to the address electrodes 38 and 39. In correspondence with the switching conditions of the connected transistors, one of the address electrodes 38 and 39 is charged with a positive voltage to serve as a plus electrode, and the other with a negative voltage to serve as a minus electrode. When a bias voltage is applied to the micromirror 35, a static power is generated between the micromirror 35 and the address electrodes 38 and 39, to tilt the micromirror 35 toward one electrode.

When the power is OFF, all the transistors are OFF, so any address electrodes 38 and 39 are not charged with voltage, and any bias voltage is applied to the micromirror 35. Therefore, the micromirror 35 is kept in the balanced state, as shown in FIG. 3A. Also, even when the mirror drive data is written in the memory cell 40, if the bias voltage is not applied, the micromirror 35 is kept in the balanced state.

The DMD 28 is connected to a not-shown mirror drive circuit. The mirror drive circuit reads out image data from a not-shown image memory one line after another, converts the image data of one line into the mirror drive data, and writes the mirror drive data in the memory cells 40 of the SRAM 37.

In this embodiment, when the mirror drive data written in the memory cell 40 is "0", the address electrode 38 functions as the plus electrode, and the address electrode 39 functions as the minus electrode. When a positive voltage is applied as the bias voltage to the micromirror 35, the micromirror 35 is inclined to the side of the address electrode 39 till the tip 35b contacts the silicone substrate, as shown in FIG. 3B, due to the static adsorption and repulsion. The tilt angle in this state is −θ. When the mirror drive data written in the memory cell 40 is "1", the address electrode 38 functions as the minus electrode, and the address electrode 39 functions as the plus electrode. When the positive bias voltage is applied to the micromirror 35, the micromirror 35 is inclined to the side of the address electrode 38 till the tip 35a contacts the silicone substrate, as shown in FIG. 3C, due to the static adsorption and repulsion. The tilt angle in this state is +θ. In this way, the micromirror 35 tilts by −θ or +θ in accordance with the mirror drive data.

While the power is supplied, the micromirror 35 takes either one of the two tilt states. In one tilt state, e.g. where the micromirror 35 tilts by +θ, a spot light beam reflected from the micromirror 35 is directed to the recording sheet 10a, thereby forming a pixel on the recording sheet 10a. Therefore, this tilt state is called an ON-state. In the other tilt state, i.e. where the micromirror 35 tilts by −θ in this instance, a spot light beam reflected from the micromirror 35 does not fall on the recording sheet 10a. Therefore, the latter tilt state is called an OFF-state.

To print a gradation image with the DMD 10, the tonal level of one pixel is determined by the total exposure time per pixel that corresponds to the total time duration of the ON-state of the micromirror 35 per pixel. Therefore, it is possible to change the tonal level of each pixel by changing the time duration of a continuous ON-state and/or the number of intermittent ON-states of the micromirror 35 per pixel in accordance with the image data of each pixel. For example, by serially writing the 1-bit mirror drive data a number of times per pixel in the memory cell 40, the micromirror 35 is intermittently set to the ON-state the same number of times per pixel.

The operation of the image recording apparatus shown in FIG. 1 will be described briefly.

To expose the recording sheet 10a, the light source 27 turns on to emit a light beam, which is projected through the condenser lens 29 onto the DMD 28. Since a series of mirror drive data is written in the DMD 28 in accordance with image data of a first line to print, the micromirrors 35 are individually set in either the ON-state or the OFF-state. The light beam falling on the DMD 28 is reflected from the ON-state micromirrors 35, and is projected as a line recording light through the image forming lens 30 onto the recording surface of the recording sheet 10a. In this way, the recording sheet 10a is exposed to the line recording light, and a latent image of the first line is photographically recorded on the recording sheet 10a.

The line image projection device 25 is moved by the scanning mechanism 26 in parallel to the sub-scan direction at the constant speed V1 that is determined with respect to an exposure time for one line, that is, the interval of projection of each line recording light. The interval of projection of each line recording light is constant and corresponds to the driving interval of the DMD 28. After the line image projection device 25 is moved by one line amount in the sub-scan direction, the DMD 28 is driven in accordance with the next series of mirror drive data that corresponds to image data of the next line to print. Thereby, a line recording light for the next line is projected onto the recording sheet 10a, recording a latent image of the next line on the recording sheet 10a adjacent to the latent image of the first line.

In this way, as the line image projection device 25 sequentially generates the line recording lights while being moved in the sub-scan direction, a latent image of one frame is recorded line by line on the recording sheet 10a. After the image frame is recorded, the scanning mechanism 26 is driven in the opposite direction to move the line image projection device 25 back to the initial position shown in FIG. 1. Then, the vacuum pump 22 is deactivated, and the conveyer belt 14 is driven to feed the exposed recording sheet 10a to a not-shown development apparatus. In the development apparatus, the latent image on the recording sheet 10a is developed.

Where a color image is to be recorded, three primary color filters are placed in front of the light source 27. Instead of placing three primary color filters in front of the single light source 27, it is possible to provide a red light source, a green light source and a blue light source. A color photographic paper may be exposed in a three color line sequential fashion, wherein line recording light strips of three colors are color-sequentially projected onto the recording sheet each time the line image projection device 25 is moved by one line in the sub-scan direction. Alternatively, the recording sheet 10a may be exposed in a three color frame sequential fashion, wherein the line image projection device 25 makes three laps of sub-scanning for each image, recording three color frames individually in the line-sequential fashion.

It is possible to use an image projection device with a DMD that has a plurality of rows of micromirrors. In that case, the same number of line recording light strips as the number of the micromirror rows are simultaneously projected onto the recording sheet, so the image projection device is intermittently moved by the length corresponding to these simultaneously recorded lines. This embodiment saves the time necessary for recording one frame. It is also possible to drive the micromirrors time-sequentially from one row to another at the same interval as one line movement of the line image projection device 25 in the sub-scan direction. According to this modification, each line on the recording sheet is exposed to a plurality of line recording light strips formed through the respective micromirror rows. So this modification is preferable for reproducing fine gradation image.

As an alternative, the digital micromirrors may be replaced with piezo-micromirrors in which a micromirror is mounted on a piezo element. The cutter 13 may be located on the right side of the roller 18, so the recording material 10 is cut into a sheet after the exposure. The recording sheet 10a may be held on a recording station by use of an electrostatic adsorption plate or a mask plate that presses leading and trailing margins of the recording sheet onto the recording station.

Figure 4:
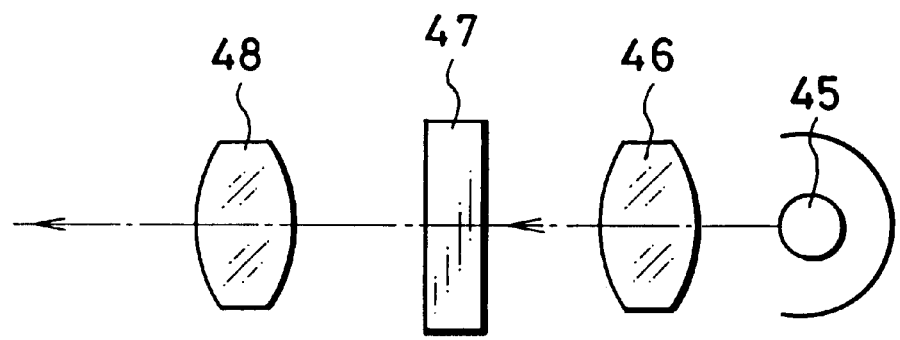
FIG. 4 is an explanatory view of a line image projection device using an LCD.

FIG. 4 shows another embodiment of line image projection device that uses an LCD 47. A light strip from a linear light source 45 is projected onto the LCD 47 through a condenser lens 46. The LCD 47 has a great number of micro-cells arranged in a line. These cells are called light valves or micro-shutters, as their light-permeability varies depending upon applied voltage. Thus, the LCD 47 partially transmits the line recording light, and the light transmitted through the LCD 47 is focused on a recording material through an image forming lens 48.

Figure 5:
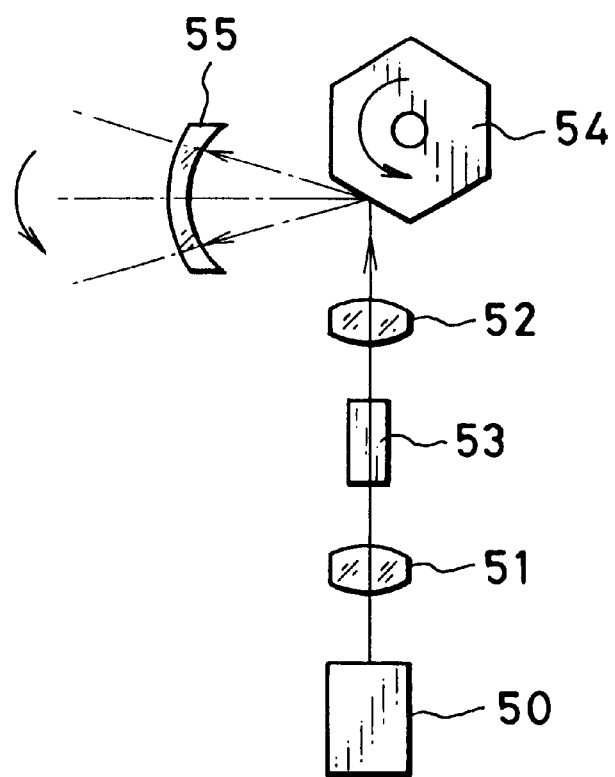
FIG. 5 is an explanatory view of a line image projection device using a laser scanner.
Figure 6:
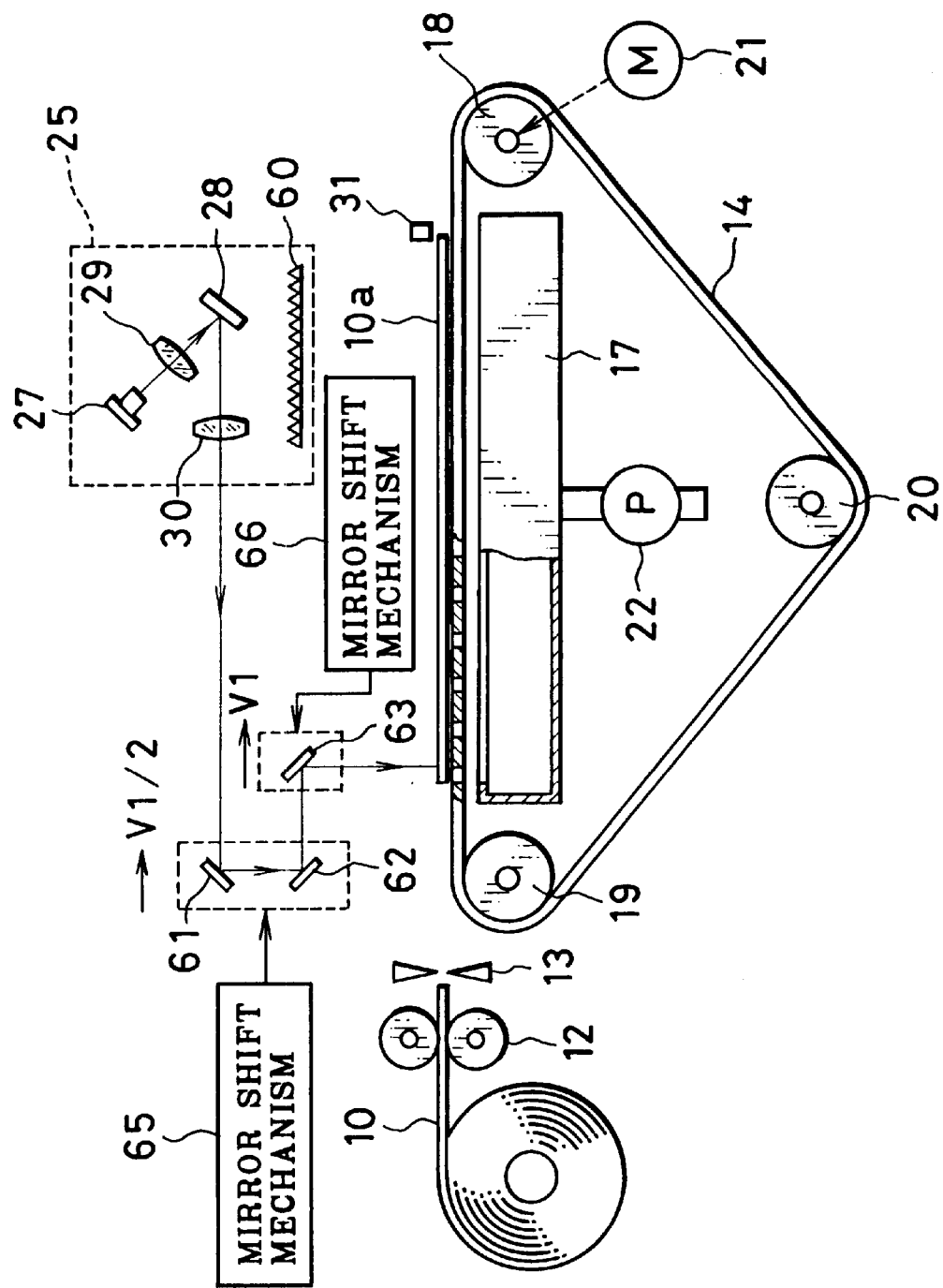
FIG. 6 is a schematic diagram of an image recording apparatus according to a second embodiment of the present invention, wherein mirrors are moved for sub-scanning.

FIG. 5 shows a laser-type line image projection device. A laser device 50 emits a laser beam that travels through collimate lenses 51 and 52 and an intensity modifier 53 and falls on a polygon mirror 54. The intensity modifier 53 modifies the intensity of the laser beam in accordance with image data. The polygon mirror 54 rotates in a direction shown by an arrow at a constant speed, to sweep the laser beam across a main scan direction of a recording material, that is, across the width of the recording material. The laser beam reflected from the polygon mirror 54 is projected onto the recording material through a fθ lens 55 that equalizes sweeping speed of the laser beam in the main scan direction. Since it is necessary to sweep the laser beam across the main scan direction of the recording material, the laser-type line image projection device takes more time for exposure than the above line image projection devices which project at least a strip of line recording light at a time.

FIGS. 6 to 15 show image recording apparatuses wherein a line image projection device 25 as well as a recording sheet 10a is maintained stationary during the exposure, but projecting positions of line recording lights from the line image projection device 25 on the recording sheet 10a are shifted in the sub-scanning direction by use of an optical scanning system. In these embodiments, the optical scanning system and the line image projection device 25 constitute a line-sequential exposure device. In FIGS. 6 to 15, the line image projection device 25 is comprised of a DMD 28, but it is possible to use the line image projection device shown in FIG. 4 or that shown in FIG. 5 instead.

The line image projection device 25 is provided with a light absorption plate 60 for absorbing light reflected from those micromirrors of the DMD 28 which are set in the OFF-state. The line image projection device 25 projects the line recording light in a direction parallel to the sub-scan direction of the recording sheet 10a held at a recording station 17. Mirrors 61 and 62 are mounted to a mirror holder such that their mirror surfaces are inclined perpendicular to each other and 45 degrees to the optical axis of the line recording light falling thereon. Thus, the mirrors 61 and 62 turn the direction of the line recording light from the line image projection device 25 by 180 degrees. The line recording light reflected from the mirror 62 falls on a mirror 63 that is held in another mirror holder and inclined 45 degrees relative to the incident light axis, so that the line recording light is reflected at a right angle by the mirror 63, and falls vertically onto the recording sheet 10a. Thereby, a line of the image is formed on the recording sheet 10a along the main scan direction.

The mirrors 61 and 62 are moved by a mirror shift mechanism 65 in parallel to the sub-scan direction of the recording sheet 10a, and the mirror 63 is moved by a mirror shift mechanism 66 in the sub-scan direction in parallel to the recording sheet 10a. Therefore, the mirror shift mechanisms 65 and 66 function as a scanning device, and may consist of an endless belt, a feed screw device and so forth, like the scanning mechanism 26 of the above embodiment. The mirrors 61 to 63 and the mirror shift mechanisms 65 and 66 constitute the optical scanning system.

Figure 7:
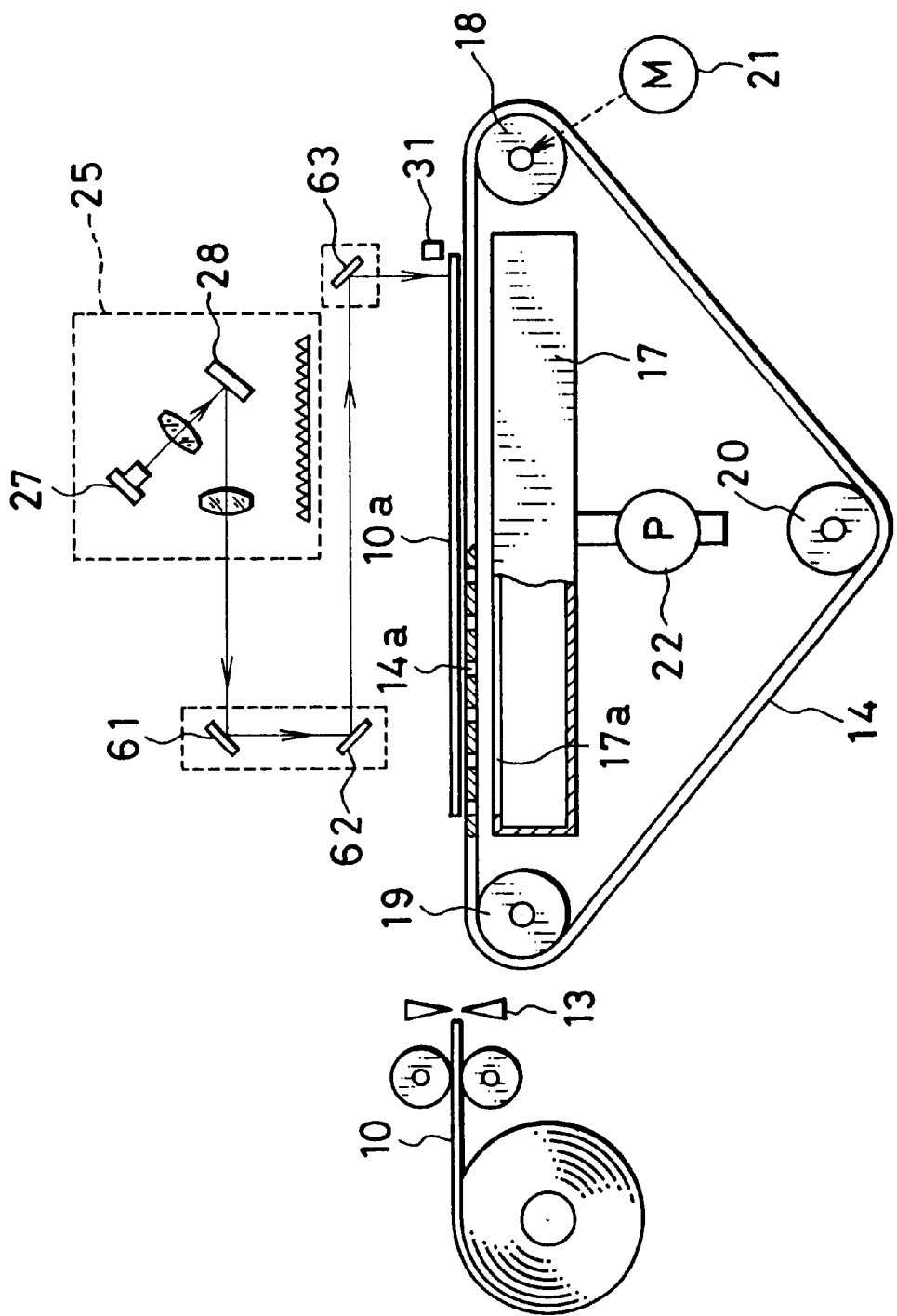
FIG. 7 is a schematic diagram of the image recording apparatus according to the second embodiment, illustrating terminal positions of the mirrors.

The line image projection device 25 projects the line recording light strips at constant intervals. Synchronously with the sequential projection of the line recording lights from the line image projection device 25, the mirror shift mechanism 66 moves the mirror 63 at a constant speed V1 toward a leading end of the recording sheet 10a, while the mirror shift mechanism 65 moves the mirrors 61 and 62 toward the leading end of the recording sheet 10a at a constant speed V1/2 that is half the speed V1 of the mirror 63. In this way, each line recording light is projected onto a different position on the recording sheet 10a that is shifted by one-line amount in the sub-scan direction from the preceding projecting position. On the other hand, the length of the light path from the line image projection device 25 to the recording sheet 10a is maintained unchanged during the sub-scanning. When the mirrors 61 to 63 come to their terminal positions as shown in FIG. 7, an image frame is photographically recorded on the recording sheet 10a in the line-sequential fashion. It is possible to use a prism having two reflective surfaces instead of the mirrors 61 and 62.

Figure 8:
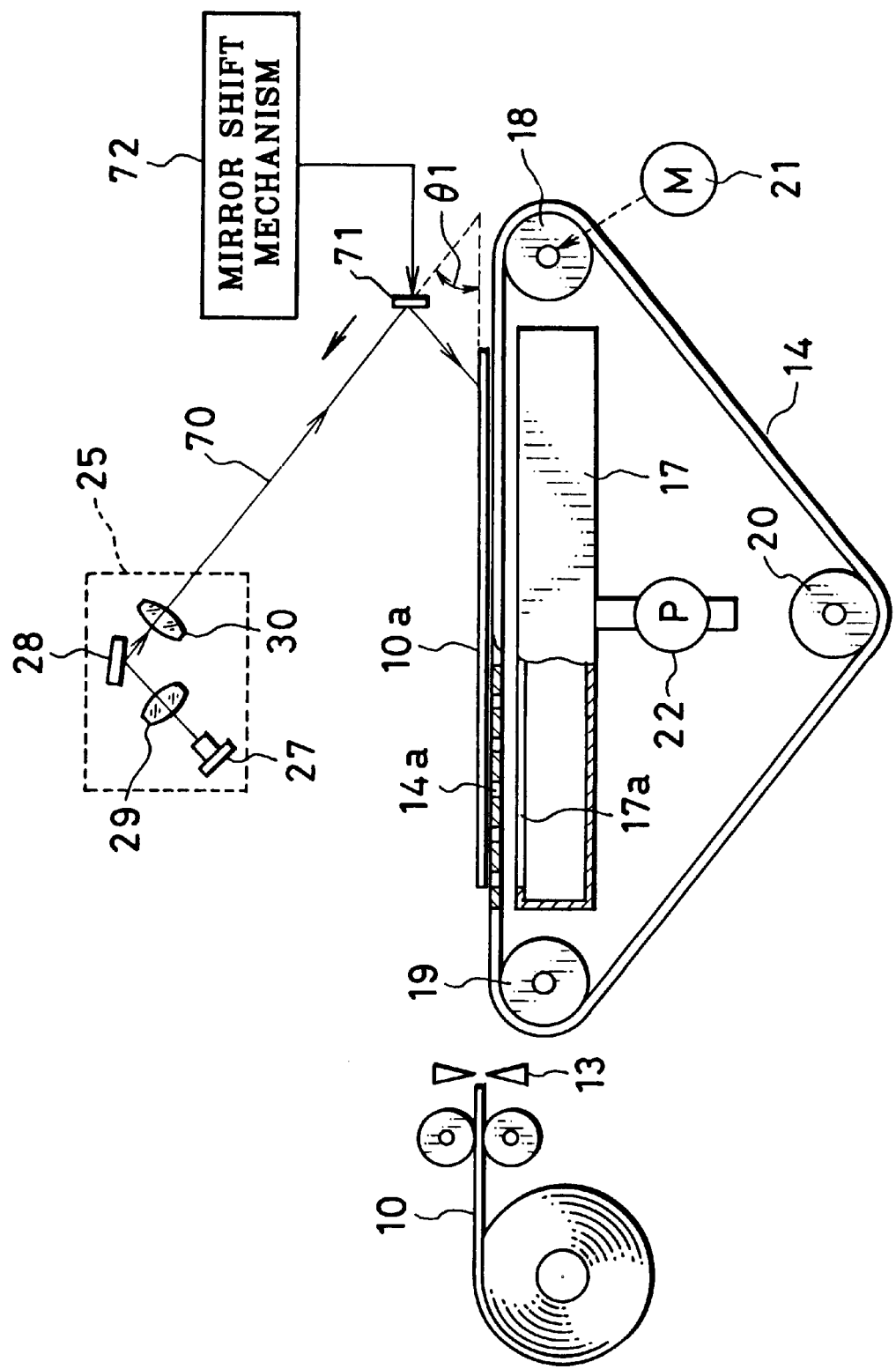
FIG. 8 is a schematic diagram of an image recording apparatus according to a third embodiment of the present invention, wherein a single small mirror is moved in the sub-scan direction.
Figure 9:
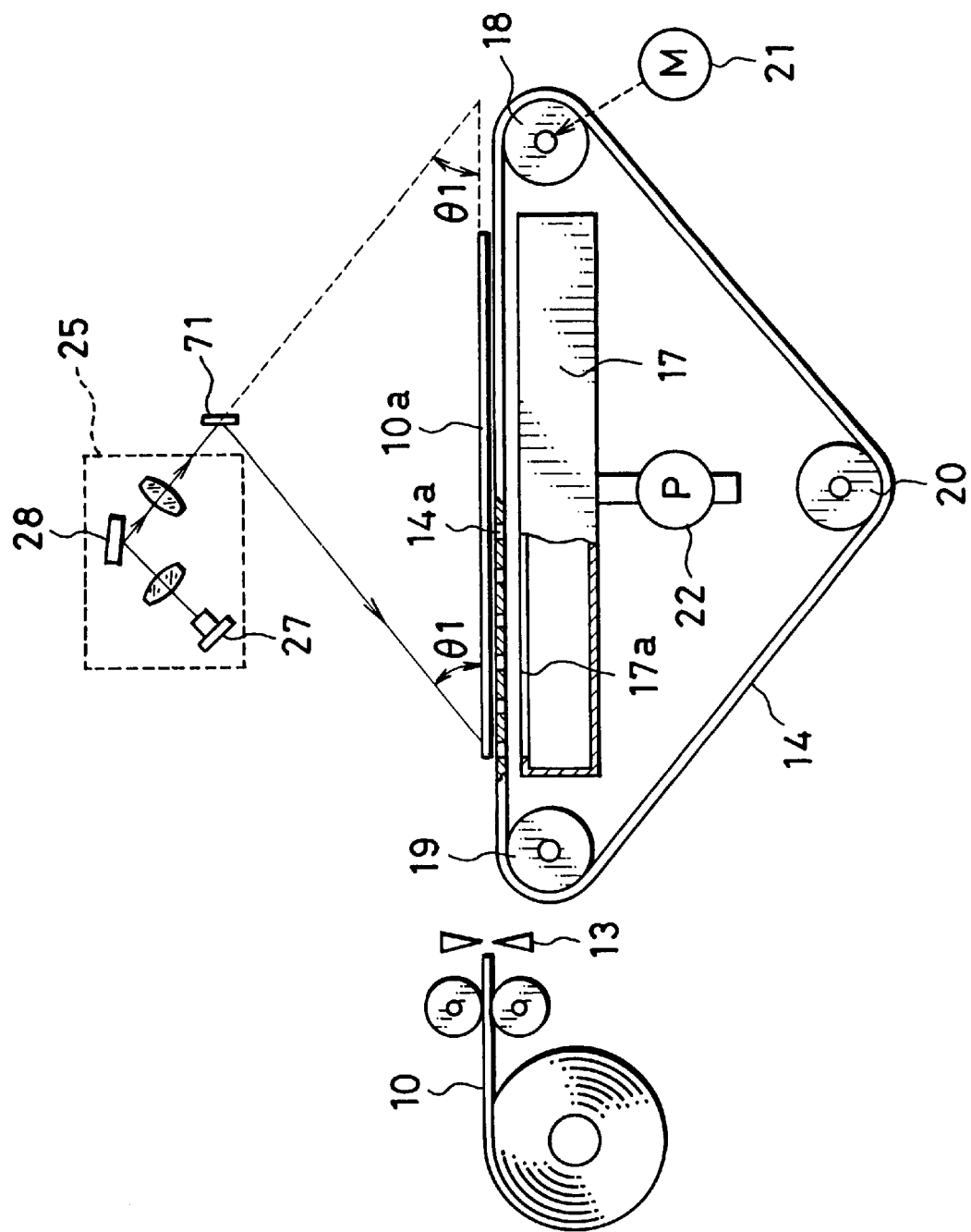
FIG. 9 is a schematic diagram of the image recording apparatus according to the third embodiment of the present invention, illustrating a terminal position of the mirror.

In the image recording apparatus shown in FIGS. 8 and 9, a single mirror 71 constitutes an optical scanning system. Each line recording light generated from a line image projection device 25 travels along a light path 70 that is inclined at an angle θ1 to a recording sheet 10a at a recording station 17. The mirror 71 is placed on the light path 70 to direct the line recording light toward the recording sheet 10a. The mirror 71 is inclined perpendicular to the recording sheet 10a. A mirror shift mechanism 72 shifts the mirror 71 along the light path 70 such that the inclination angle of the mirror 71 is maintained unchanged (i.e., translation operation), so that the projecting position of the line recording light is shifted in the sub-scan direction while the length of the light path 70 from the image forming lens 30 to the recording sheet 10a is maintained unchanged.

When the mirror 71 is moved from an initial position shown in FIG. 8 to a terminal position shown in FIG. 9, an image frame is photographically recorded on the recording sheet 10a. Because the mirror 71 is the only element to move for sub-scanning, the line-sequential exposure device of this embodiment can be so compact that it is easy to combine a frame exposure device with the line-sequential exposure device, as shown for example in FIG. 10.

Figure 10:
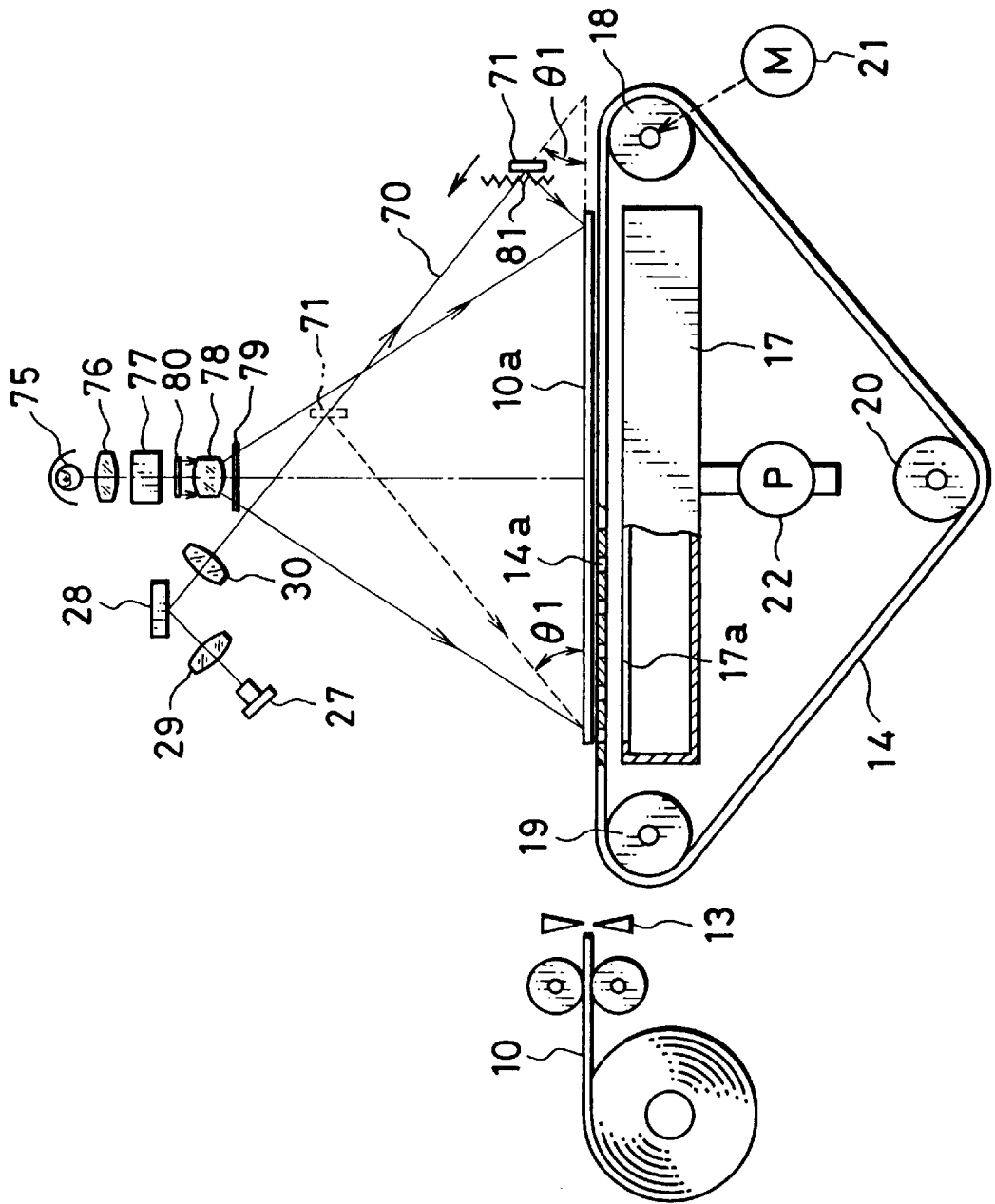
FIG. 10 is a schematic diagram of an image recording apparatus according to a fourth embodiment of the present invention, which is similar to the third embodiment but has a frame exposure device in addition to a linesequential exposure device.

In FIG. 10, the frame exposure device is constituted of a light source 75 such as a halogen lamp, a condenser lens 76, a diffusion box 77, an image forming lens 78 and a shutter 79. The image forming lens 78 is used for projecting an optical image of an image frame that is recorded on a photo filmstrip 80, e.g. a negative filmstrip, onto a recording sheet 10a. A light-shielding member 81 is provided for shielding the mirror 71 during the frame exposure, so the recording sheet 10a is not exposed to light reflected from the mirror 71 during the frame exposure.

According to the embodiment shown in FIG. 10, it is possible to select one of three exposure modes: line-sequential exposure mode, frame exposure mode and combination mode. When printing based on an image signal, the line-sequential mode is selected, wherein the light-shielding member 81 is retracted from the front of the mirror 71, and the mirror 71 is moved along the light path 70 in the same way as described with respect to FIGS. 8 and 9. While the mirror 71 moves from an initial position shown by solid lines to a terminal position shown by phantom lines in FIG. 10, an image frame is line-sequentially recorded on the recording sheet 10a.

In the frame exposure mode, an image frame on the photo filmstrip 80 is illuminated by the light source 75. When the shutter 79 is opened, an optical image of the image frame of the photo filmstrip 80 is projected through the image forming lens 78 onto the recording sheet 10a. After a predetermined time, the shutter 79 is closed to terminate the frame exposure. The combination mode is selected when printing letters or illustrations in combination with a photographic image, for example, for producing a post card. In that case, an image frame of the photo filmstrip 80 is recorded on the recording sheet 10a by the frame exposure, and characters are recorded on the recording sheet 10a by the line-sequential exposure.

Because it is possible to use the frame exposure and the line-sequential exposure according to the purpose, the embodiment shown in FIG. 10 is useful for making an index print and individual prints from an IX 240 type filmstrip. To make an index print, image data of all image frames on the filmstrip is read by an image scanner, and is processed such that the image frames are reduced in size and arranged in a matrix. Thereafter the filmstrip is set in the frame exposure device to record individual image frames sequentially onto the recording sheet 10a. After all the image frames are recorded by the frame exposure device, the DMD 28 is driven in accordance with the processed image data from the image scanner, to record an index image on the recording sheet 10a in the line-sequential fashion.

Figure 11:
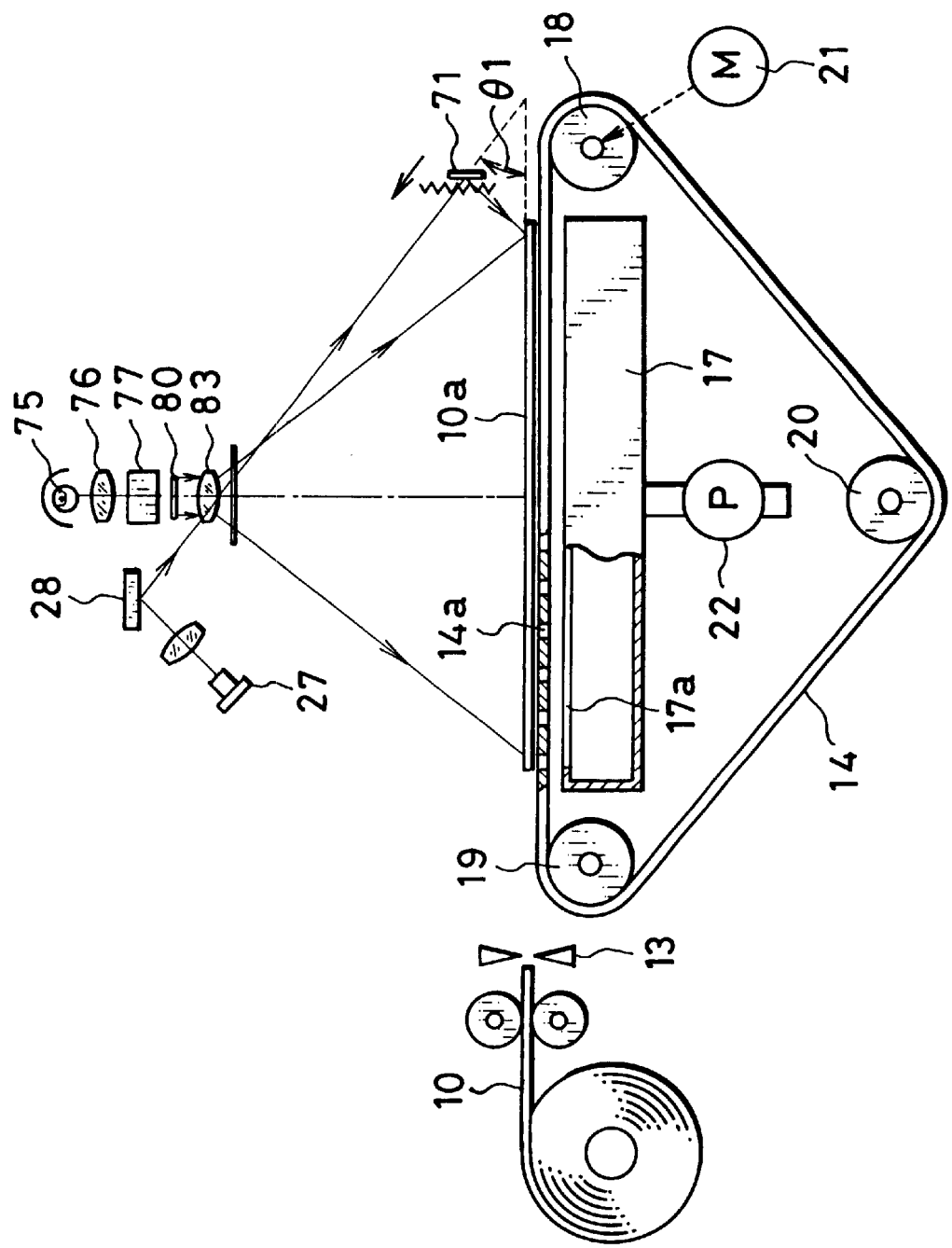
FIG. 11 is a schematic diagram of an image recording apparatus according to a fifth embodiment of the present invention, wherein an image forming lens is used commonly for line-sequential exposure and frame-simultaneous exposure.

In the image recording apparatus shown in FIG. 11, an image forming lens 83 of a frame exposure device is also used for the line-sequential exposure. That is, the image forming lens 83 is used not only for projecting a photographic image of a photo filmstrip 80 onto a recording sheet 10a, but also for projecting each line recording light from the DMD 28 onto the recording sheet 10a through a mirror 71. The embodiment of FIG. 11 contributes to making the exposure device more compact and economical.

Figure 12:
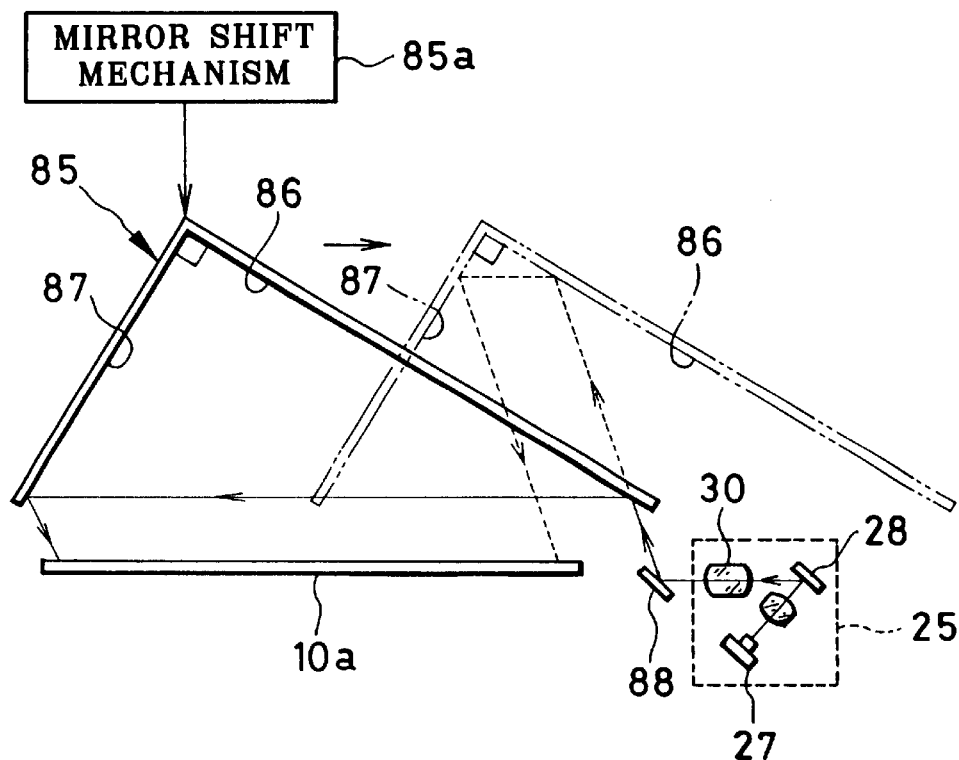
FIG. 12 is an explanatory view of a line-sequential exposure device using a roof mirror device as an optical scanning system.

In FIG. 12, an optical scanning device is constituted of a roof mirror 85 having a pair of large mirror surfaces 86 and 87. The mirror surfaces 86 and 87 meet at right angles with each other. A line recording light from the line image projection device 25 is directed by a fixed mirror 88 toward the mirror surface 86. The mirror surface 86 reflects the line recording light into a direction parallel to a recording sheet 10a to expose. The other mirror surface 87 reflects the line recording light downward to the recording sheet 10a. Synchronously with the projection of the line recording light from the line image projection device 25, a mirror shift mechanism 85a moves the roof mirror 85 in a sub-scan direction shown by an arrow at a constant speed from an initial position shown by solid lines to a terminal position shown by phantom lines. When the mirror 85 reaches the terminal position, an image frame is recorded on the recording sheet 10a. The mirror surfaces 86 and 87 may be of an integral mirror or separate mirrors. It is possible to use a prism having two reflective surfaces instead of the roof mirror 85.

As shown in FIG. 12, positions on the mirror surfaces 86 and 87 where the line recording light is reflected move along with the movement of the roof mirror 85 in the sub-scan direction. Accordingly, the roof mirror 85 may be replaced by a pair of small mirrors 90 and 91, as shown in FIG. 13, if only the small mirrors 90 and 91 are moved along the same courses 92 and 93 as the reflecting positions of the line recording light on the mirror surfaces 86 and 87.

Specifically, the mirror 90 is inclined at the same angle as the mirror surface 86, and the mirror 91 is inclined at the same angle as the mirror surface 87. The mirror 90 is moved by a mirror shift mechanism 90a along the course 92 without changing its inclination angle. The course 92 extends from the initial reflecting position on the mirror surface 86 shown by solid lines in FIG. 12 to the final reflecting position on the mirror surface 86 shown by dashed lines in FIG. 12. That is, the course 92 extends along the light path of the line recording light falling on the mirror 90. Simultaneously with the mirror 90, the mirror 91 is moved by a mirror shift mechanism 91a along the course 93 without changing its inclination angle. The course 93 extends from the initial reflecting position on the mirror surface 87 shown by solid lines in FIG. 12 to the final reflecting position on the mirror surface 87 shown by dashed lines in FIG. 12.

Figure 13:
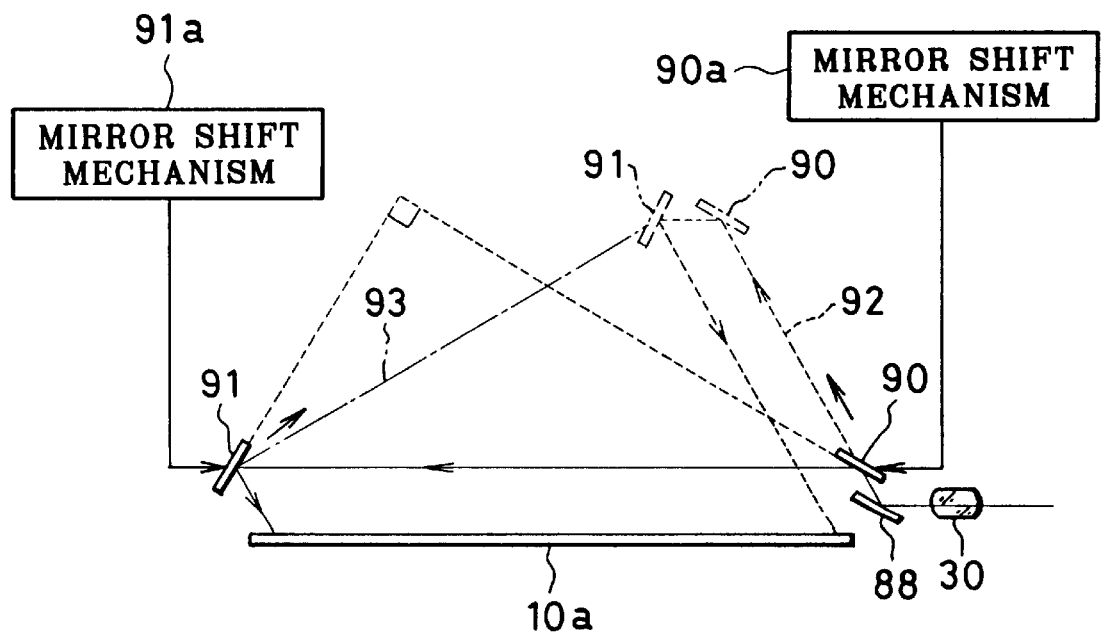
FIG. 13 is an explanatory view of a line-sequential exposure device using two small mirrors instead of the roof mirror device shown in FIG. 12.

At the beginning of exposure for one frame, the mirrors 90 and 91 are located in initial positions shown by solid lines in FIG. 13. The mirrors 90 and 91 move along the respective courses 92 and 93 at different speeds such that the vertical heights of the mirrors 90 and 91 from the recording sheet 10a are maintained equal to each other. Therefore, the speeds of movement of the mirrors 90 and 91 are proportional to the lengths of the respective courses 92 and 93. At the end of exposure for one frame, the mirrors 90 and 91 are located in terminal positions shown by phantom lines in FIG. 13. That is, the distance between the mirrors 90 and 91 decreases as the mirrors 90 and 91 get close to the terminal position. Thus, the small mirrors 90 and 91 provide the same optical scanning operation as the large roof mirror 85 of FIG. 12. Because it is only necessary to move the small mirrors 90 and 91, the embodiment of FIG. 13 is simple and compact in construction.

Figure 14:
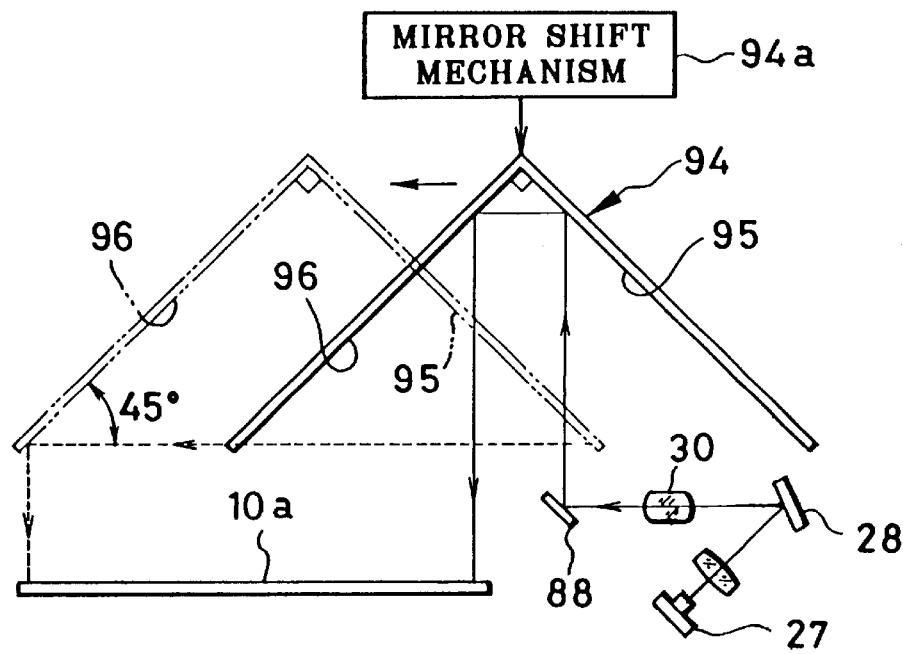
FIG. 14 is an explanatory view of a line-sequential exposure device whose optical scanning system is constituted of a roof mirror device which forms a rectangular equilateral triangle with a plane parallel to a recording sheet.

In FIG. 14, an optical scanning system is constituted of a roof mirror 94 having two mirror surfaces 95 and 96 which meet at right angles with each other and form a rectangular equilateral triangle with a plane parallel to a recording sheet 10a. Each line recording light is reflected rectangularly by a mirror 88 toward the mirror surface 95, and is reflected rectangularly from the mirror surface 95 toward the other mirror surface 96. The mirror surface 96 rectangularly reflects the line recording light, so the line recording light is projected vertically to the recording sheet 10a. As the roof mirror 94 is moved by a mirror shift mechanism 94a at a constant speed in a sub-scan direction shown by an arrow, an image frame is recorded line by line on the recording sheet 10a.

Figure 15:
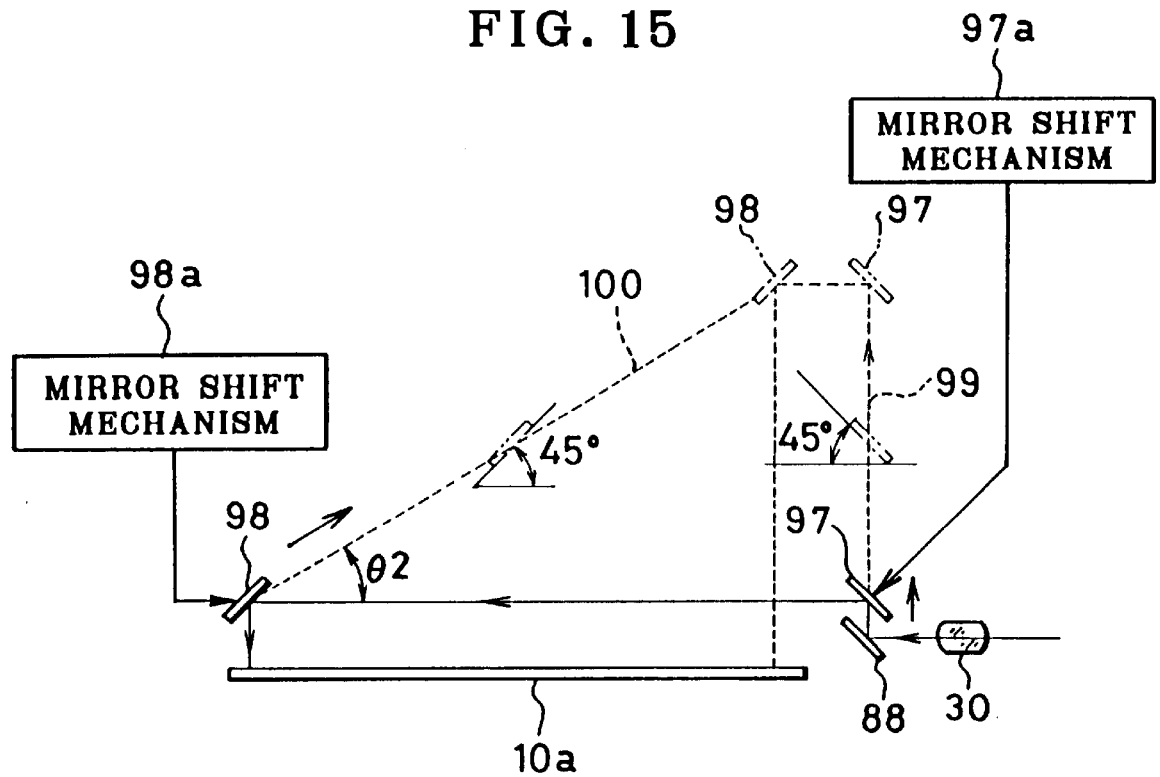
FIG. 15 is an explanatory view of a line-sequential exposure device using two small mirrors instead of the roof mirror device shown in FIG. 14.

FIG. 15 shows an improvement over the optical scanning system of FIG. 14. A pair of small mirrors 97 and 98 take place the large roof mirror 94. The mirrors 97 and 98 are inclined at 45 degrees to a recording sheet 10a, and at right angles to each other. The mirror 97 is moved by a mirror shift mechanism 98a along a course 99 that is vertical to the recording sheet 10a and extends along the optical axis of the incident light or the line recording light falling on the mirror 97. On the other hand, the mirror 98 is moved by a mirror shift mechanism 98a along a course 100 that is inclined at an angle θ2 to the recording sheet 10a. In the same way as the mirrors 90 and 91 of FIG. 13, the mirrors 97 and 98 are moved concurrently while their vertical heights from the recording sheet 10a being maintained equal to each other. Assuming that the angle θ2 is 30 degrees, the course 100 of the mirror 98 is twice as long as the course 99 of the mirror 97. In that case, the mirror 98 should move twice as fast as the mirror 99. Because it is only necessary to move the small mirrors 97 and 98, the embodiment of FIG. 15 is simple and compact.

It is of course possible to make sub-scanning in the opposite direction, that is, from the position shown by phantom lines to the position shown by solid lines. This applies to any of the above embodiments. That is, sub-scanning may be performed in the opposite direction to the direction shown by the arrow.

Figure 17:
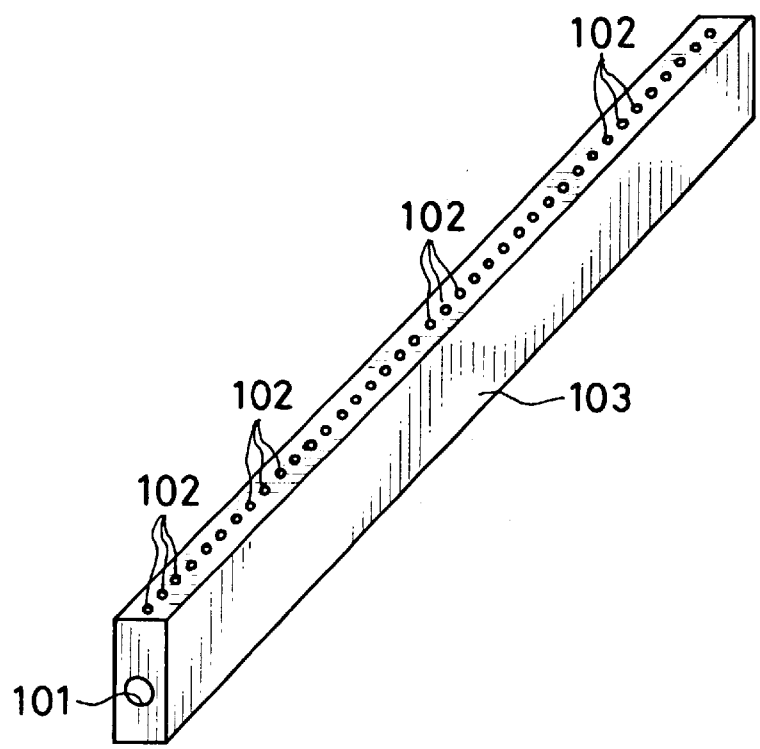
FIG. 17 is an explanatory view of a line image projection device using an ink jet recording head.

FIG. 17 shows an ink jet recording head 103 having a large number of nozzles 102 arranged in a row along the main scan direction, as another embodiment of the line image projection device 25 of the image recording apparatus shown in FIG. 16. Ink is fed to the recording head 103 through a bung hole 101, and is ejected through the nozzles 102 toward the recording sheet 10a. As a result, a line of ink dots are recorded at a time. Synchronously with the ink ejection intervals, the recording head 103 moves at a constant speed in parallel to the sub-scan direction of the recording sheet 10a that is held stationary at the recording station 17, thereby recording an image frame on the stationary recording sheet 10a.

Figure 18:
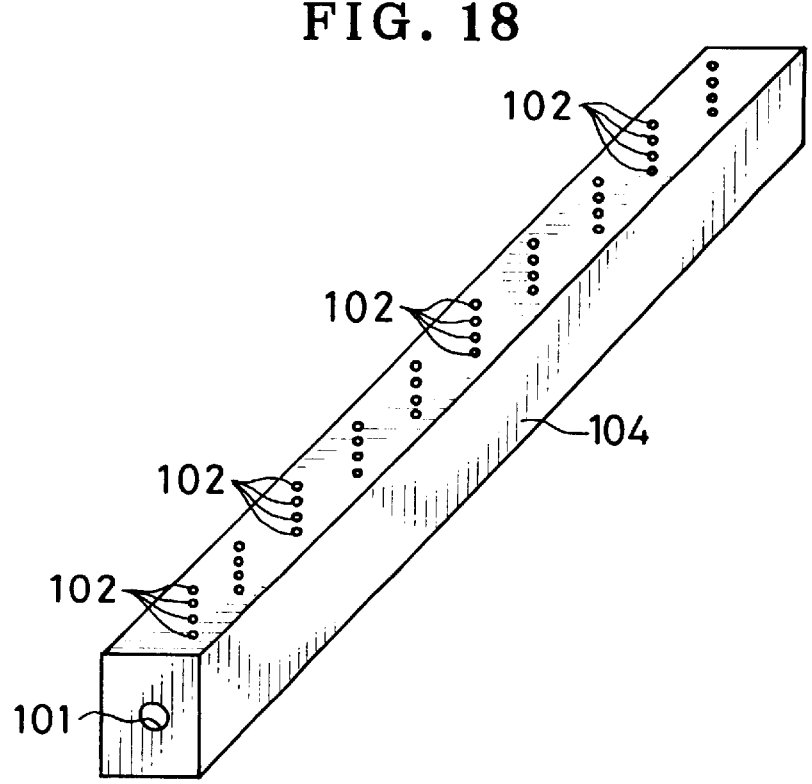
FIG. 18 is an explanatory view of a line image projection device using another ink jet recording head.

FIG. 18 shows another ink jet recording head 104 for use as the line image projection device 25. The recording head 104 has four rows of nozzles 102 aligned in the main scan direction. Ink is fed in through a bung hole 101 and is ejected through the nozzles 102 toward the recording sheet 10a. Thus, four lines of ink dots are recorded at once. As the nozzles 102 of each row are staggered in the main scan direction from those of the adjacent row, it is possible to record a half-tone image by driving some of the nozzles 102 while shifting the recording head 104 by one line amount in the sub-scan direction. Where the pixel density can be low, the recording head 104 may be moved stepwise by a length corresponding to four lines in the sub-scan direction for speeding the recording.

Figure 19:
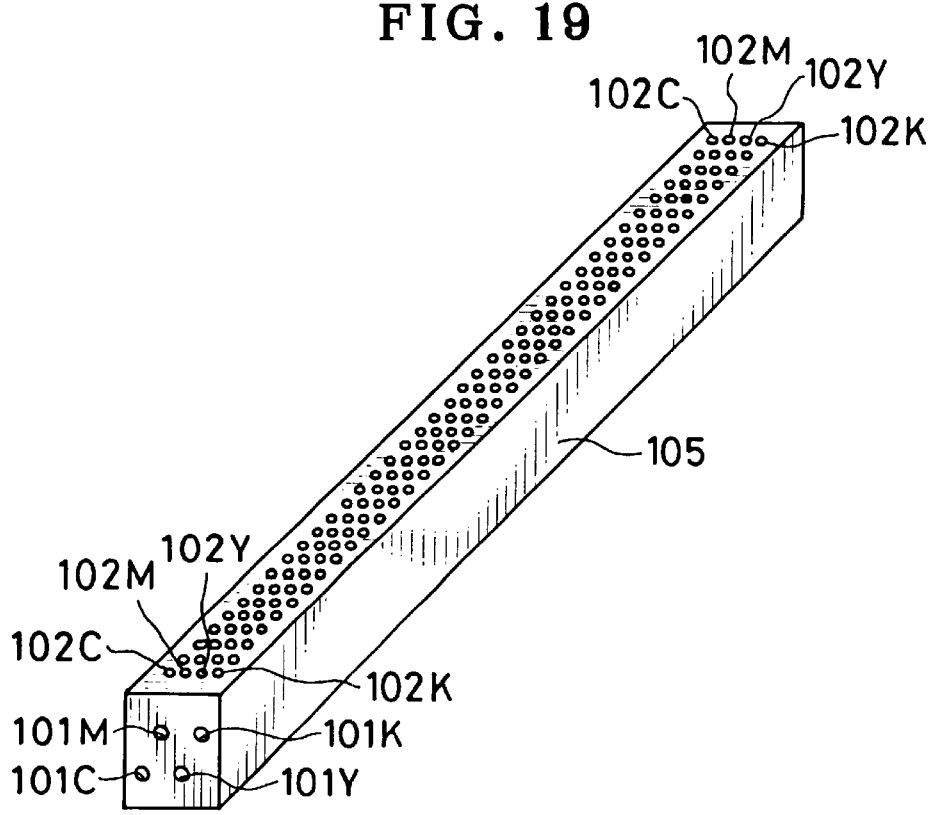
FIG. 19 is an explanatory view of a line image projection device using a color ink jet recording head.

It is possible to use a color ink jet recording head 105 as the line image projection device 25, as shown in FIG. 19. The recording head 105 is provided with four bung holes 101Y, 101M, 101C and 101K for yellow ink, magenta ink, cyan ink and black ink respectively. Nozzles for yellow 102Y, nozzles for magenta 102M, nozzles for cyan 102C and nozzles for black 102K are arranged in a row for each color along the main scan direction, so the recording head 105 has four rows of nozzles. In this embodiment, the nozzles 102Y, 102M, 102C and 102K are driven time-sequentially from one row to another at the same interval as one line movement of the recording head 105 in the sub-scan direction. Accordingly, dots of the four colors are recorded color-sequentially in each line to provide a line of the color image. It is alternatively possible to record a color image in a color frame sequential fashion by moving the recording head 105 four laps.

Figure 20:
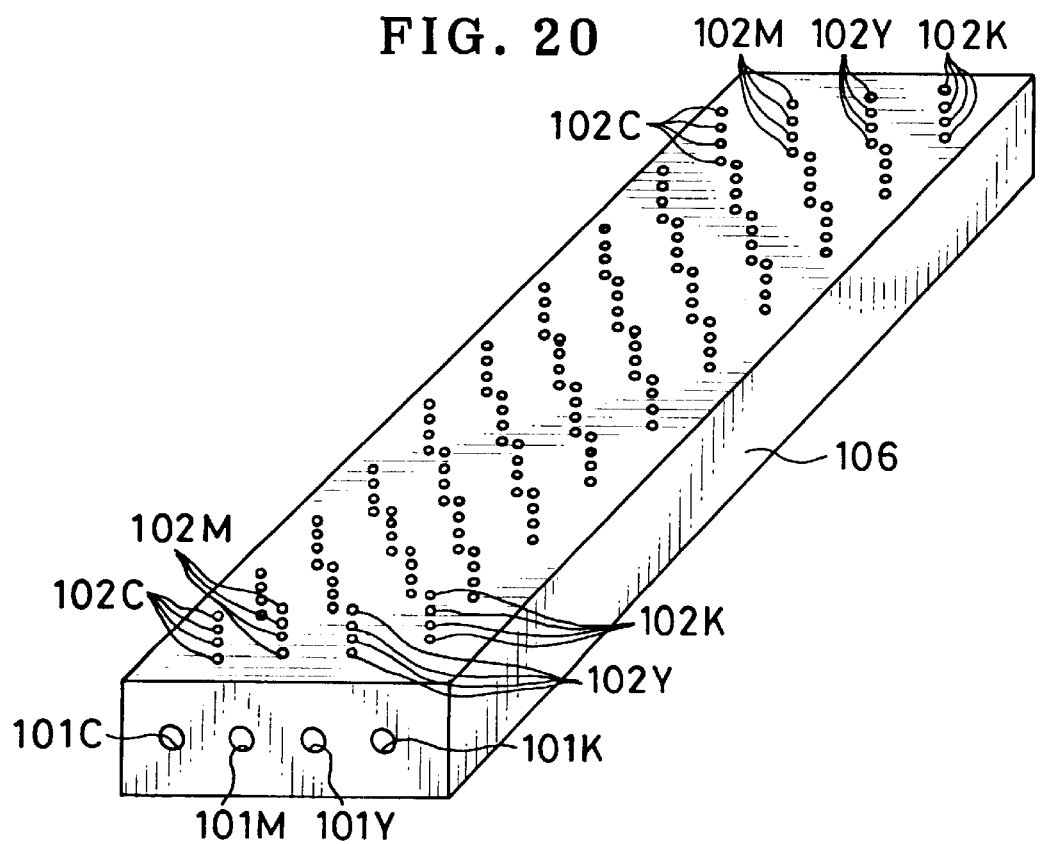
FIG. 20 is an explanatory view of a line image projection device using another color ink jet recording head.

It is also possible to use a color ink jet recording head 106 having a plurality of rows of nozzles for each color, as shown in FIG. 20. As the nozzles 102Y, 102M, 102C and 102K of each row are staggered in the main scan direction from those of the adjacent row of the same color, it is possible to record a half-tone color image in an area gradation method by driving some of the nozzles 102Y, 102M, 102C and 102K while moving the recording head 106 by one line amount in the sub-scan direction.

Although the present invention has been described with respect to the embodiments shown in the drawings where images are recorded photographically or by ink jetting, the present invention should not be limited to the above embodiment. The present invention is applicable to any kind of line-sequential recording using electromagnetic rays, such as X rays, ultraviolet rays, infrared rays, electron beams, or liquid, powdery or gaseous pigment. Thus, various modifications will be possible to those skilled in the art without departing from the scope of claims attached hereto.

What is claimed is:

1. An image recording apparatus comprising:
   a holding device for holding a photosensitive material stationary at a recording station;
   a line image projection device for projecting recording light onto the photosensitive material for recording at least one line at a time along a main scan direction while the photosensitive material is held stationary at the recording station;
   a scanning device for shifting projecting position of the recording light onto the photosensitive material in a sub-scan direction perpendicular to the main scan direction at a constant speed, to record an image frame line by line on the stationary photosensitive material, wherein the scanning device further comprises:
      a mirror for directing the recording light from the image projection device toward the photosensitive material; and
      a mirror shift device for shifting the mirror along a light path of the recording light that is defined by the line image projection device and the projecting position of the recording light on the photosensitive material, the mirror shift device maintaining the mirror at a constant angle to the photosensitive material.

2. An image recording apparatus of claim 1, further comprising a frame exposure device for recording an image frame at a time.

3. An image recording apparatus of claim 1, wherein the image projection device comprises a light source, a digital micromirror device having an array of micromirrors and an image forming lens.

4. An image recording apparatus of claim 1, wherein the image projection device comprises a light source, a liquid crystal display and an image forming lens.

5. An image recording apparatus comprising:
   a holding device for holding a photosensitive material stationary at a recording station;
   a line image projection device for projecting recording light onto the photosensitive material for recording at least one line at a time along a main scan direction while the photosensitive material is held stationary at the recording station;
   a scanning device for shifting projecting position of the recording light onto the photosensitive material in a sub-scan direction perpendicular to the main scan direction at a constant speed, to record an image frame line by line on the stationary photosensitive material, wherein the scanning device further comprises:
   a mirror device having first and second mirror surfaces oriented perpendicular to each other, the first mirror surface receiving the recording light from the image projection device and directing the recording light in a direction parallel to the sub-scan direction of the photosensitive material, and second mirror surface receiving the recording light reflected from the first mirror surface and directing light toward the photosensitive material; and
      a mirror shift device for shifting the mirror device at the constant speed in parallel to the sub-scan direction of the photosensitive material.

6. An image recording apparatus of claim 5, further comprising a frame exposure device for recording an image frame at a time.

7. An image recording apparatus of claim 5, wherein the image projection device comprises a light source, a digital micromirror device having an array of micromirrors and an image forming lens.

8. An image recording apparatus of claim 5, wherein the image projection device comprises a light source, a liquid crystal display and an image forming lens.

9. An image recording apparatus of claim 9, further comprising a frame exposure device for recording an image frame at a time.

10. An image recording apparatus of claim 9, wherein the image projection device comprises a light source, a digital micromirror device having an array of micromirrors and an image forming lens.

11. An image recording apparatus of claim 9, wherein the image projection device comprises a light source, a liquid crystal display and an image forming lens.

12. An image recording apparatus comprising:
- a holding device for holding a photosensitive material stationary at a recording station;
- a line image projection device for projecting recording light onto the photosensitive material for recording at least one line at a time along a main scan direction while the photosensitive material is held stationary at the recording station;
- a scanning device for shifting projecting position of the recording light onto the photosensitive material in a sub-scan direction perpendicular to the main scan direction at a constant speed, to record an image frame line by line on the stationary photosensitive material, wherein the scanning device further comprises:
    - a first mirror placed in a light path of the recording light from the image projection device at an inclination angle to the light path for directing the recording light in a direction parallel to the sub-scan direction of the photosensitive material;
    - a second mirror for receiving the recording light reflected from the first mirror and directing the recording light toward the photosensitive material, the second mirror being inclined perpendicular to the first mirror;
    - a first mirror shift device for shifting the first mirror along the light path of the recording light while maintaining the inclination angle of the first mirror unchanged; and
    - a second mirror shift device for shifting the second mirror simultaneously with the first mirror while maintaining the inclination angle of the second mirror unchanged, such that the second mirror moves to a same height as the first mirror from the photosensitive material, but a spacing between the first mirror and the second mirror in the sub-scan direction is changed at the constant speed.

\* \* \* \* \*